(12) United States Patent
Krasuski et al.

(10) Patent No.: US 7,580,902 B2
(45) Date of Patent: Aug. 25, 2009

(54) PRINTING METHOD FOR A COMPACT MACHINE AND AN ASSOCIATED MACHINE

(75) Inventors: Marek Krasuski, Fontenay Aux Roses (FR); Michel Fajour, Chatillon (FR)

(73) Assignee: NEOPOST Technologies, Bagneux (FR)

( * ) Notice: Subject to any disclaimer, the term of this patent is extended or adjusted under 35 U.S.C. 154(b) by 637 days.

(21) Appl. No.: 10/988,264

(22) Filed: Nov. 12, 2004

(65) Prior Publication Data

US 2005/0203859 A1    Sep. 15, 2005

(30) Foreign Application Priority Data

Nov. 20, 2003  (FR) .................................. 03 13573

(51) Int. Cl.
*G06F 17/00* (2006.01)
*G07B 17/02* (2006.01)
(52) U.S. Cl. ...................... 705/408; 705/401
(58) Field of Classification Search .................. 705/408
See application file for complete search history.

(56) References Cited

U.S. PATENT DOCUMENTS

| 4,800,505 | A | * | 1/1989 | Axelrod et al. ............. 700/221 |
| 5,493,500 | A | * | 2/1996 | Boorsma ..................... 705/406 |
| 6,389,327 | B1 |   | 5/2002 | Thiel ............................ 700/227 |
| 2003/0204477 | A1 | * | 10/2003 | McNett ....................... 705/406 |
| 2004/0066032 | A1 | * | 4/2004 | Fabel et al. .................. 283/61 |
| 2004/0122775 | A1 | * | 6/2004 | Salomon ..................... 705/401 |

FOREIGN PATENT DOCUMENTS

| DE | 38 36 038 A1 | 4/1990 |
| DE | 199 16 363 A1 | 10/2000 |
| EP | 0 944 028 A2 | 9/1999 |
| GB | 2 235 656 A | 3/1991 |

OTHER PUBLICATIONS

Hudson, Marion. "Product Focus: Mailing systems & Addressing Software" Office Solutions v20n3 pp. 33-40. May/Jun. 2003.*

* cited by examiner

*Primary Examiner*—John W Hayes
*Assistant Examiner*—Allen J Jung
(74) *Attorney, Agent, or Firm*—Sughrue Mion, PLLC

(57) ABSTRACT

A printing method for printing a mail item in a franking machine, the mail item carrying postal-imprint data and other printed data, in which method, during the process of continuously printing on the mail item in the franking machine, the other printed data is printed first, before printing the postal imprint data.

2 Claims, 3 Drawing Sheets

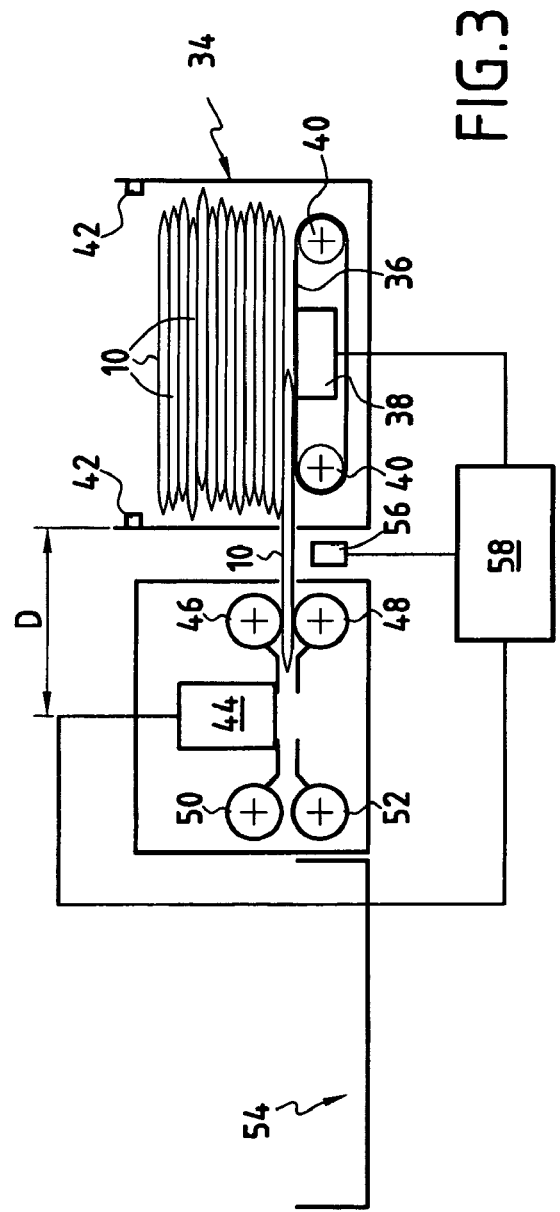
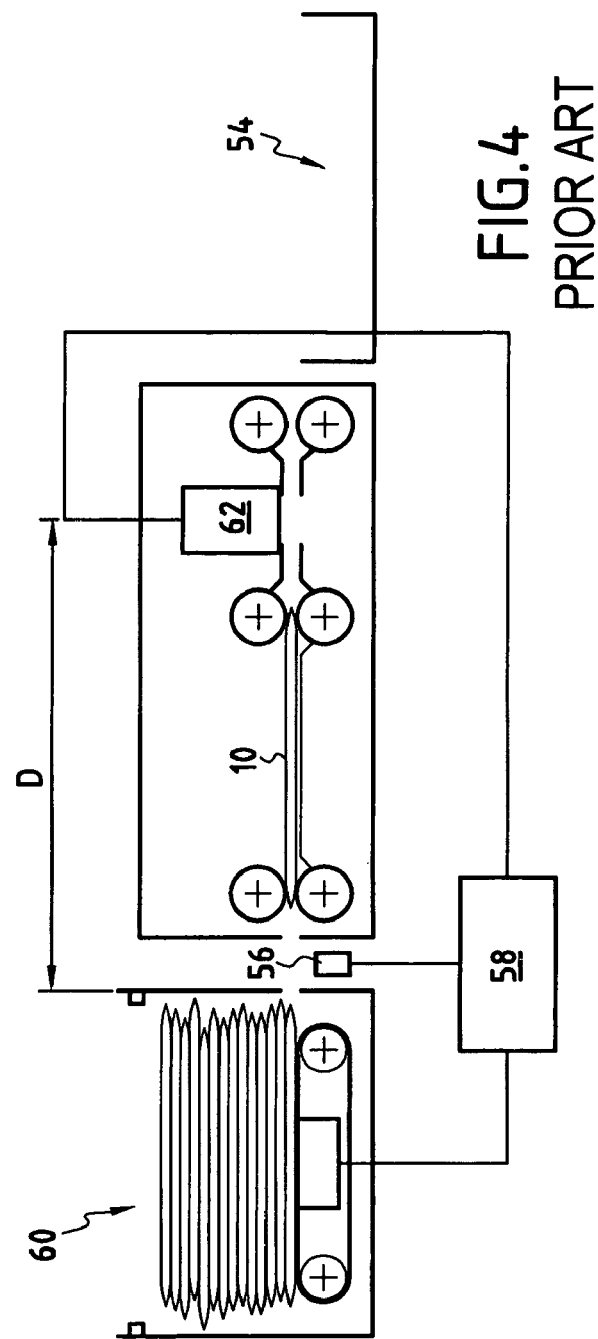

PRINTING METHOD FOR A COMPACT MACHINE AND AN ASSOCIATED MACHINE

CROSS-REFERENCE TO RELATED APPLICATIONS

This application claims priority from French Patent Application No. 03 13573 filed Nov. 20, 2003.

BACKGROUND OF THE INVENTION

1. Field of Invention

The present invention relates exclusively to the field of processing mail, and it relates more particularly to a new method of printing mail items, with said method making it possible to produce postage meters or "franking machines" that are more compact.

2. Brief Description of Related Developments

At present, numerous constraints exist in designing higher-performance franking machines that are capable, in particular, of achieving printing rates greater than 10,000 envelopes per hour, and that have dimensions that are reasonable, or indeed compact. Amongst said constraints is the possibility of implementing more and more value-added services associated with any particular mail item, thereby making it necessary to take into account and process additional data for printing. The time factor is thus very important, and all the more so since the mail item is weighed "on the fly". It is necessary to process all the data more quickly, and in particular to calculate the enciphered or signed postal imprint more rapidly.

SUMMARY OF THE INVENTION

The present invention is based on the finding made by the inventors, that the information to be printed on a mail item can be divided into two groups. A first group of information comprises the information which does not require any specific calculation: the destination address, the sender's address, the various service markings or other information messages, and the slogan, for example; and a second group of information comprises information which requires special calculation or processing: the franking charge (calculated from the weight of the mail item), the authentication code(s) (calculated amongst other things from said charge), for example, said elements being present only in the postal imprint, i.e. in the rightmost portion of the mail item.

From said findings, the inventors have thus proposed a new printing method, making it possible to produce a machine that is more compact and therefore more reliable by proceeding with anticipated calculation of the postal imprint by means of the following steps:

- determining the format and the thickness of a mail item so as to enable the postal imprint to be calculated in anticipation;
- launching the weighing operation by conveying the mail item from the differential weighing module to the print module;
- printing said other printed data on the mail item;
- detecting the end of the weighing operation by the mail item being output from the differential weighing module;
- determining the weight of the mail item;
- calculating the postal imprint to be printed; and
- printing postal-imprint data on the mail item.

Thus, with this printing method, it is possible to achieve particularly high processing speeds.

Depending on the implementation in question, the process of printing on the mail item may be performed continuously either from its rear edge to its front edge which can be accomplished by conveying the mail item in a direction that is reverse to the conventional conveying direction or conveying the mail item in the reverse direction but with the mail item upsidedown with the postal imprint being presented in the bottom lefthand corner of the mail item.

The invention also provides a franking machine comprising a print module for printing mail items, the print module being disposed directly at the outlet from a differential weighing module, wherein said differential weighing module includes a plurality of sensors for determining the format and the thickness of the mail items so as to enable the postal imprint to be calculated in anticipation, and a presence sensor interposed between said differential weighing module and said print module so as to detect when the mail items have been weighed.

BRIEF DESCRIPTION OF THE DRAWINGS

The characteristics and advantages of the present invention appear better from the following description, made by way of non-limiting indication, and with reference to the accompanying drawings, in which:

FIG. 3 shows an embodiment of a franking machine for implementing the FIG. 2 method;

FIG. 4 shows an embodiment of a prior-art franking machine; and

DETAILED DESCRIPTION OF A PREFERRED EMBODIMENT

Figure 1:
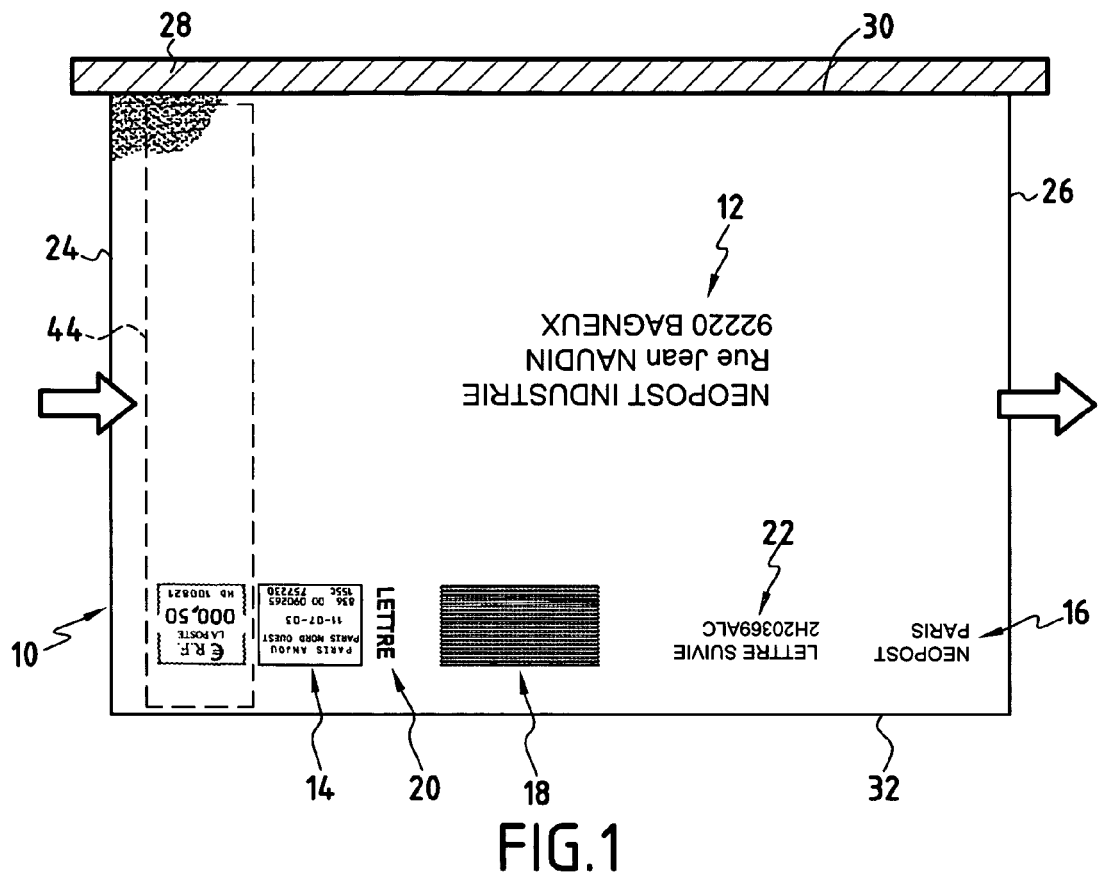
FIGS. 1 and 2 are diagrammatic views showing two implementations of the printing method of the invention.
Figure 2:
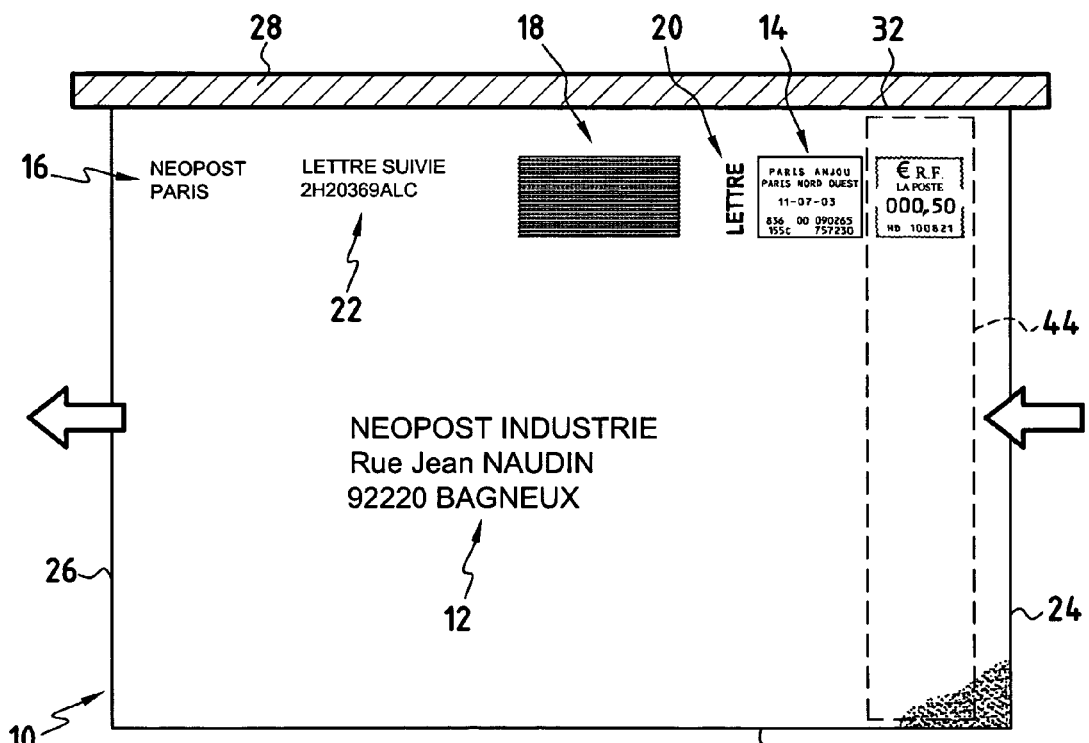

FIGS. 1 and 2 show two implementations of the printing method of the invention for printing a mail item in a franking machine. The mail item 10 includes at least a destination address 12, and a postal imprint 14 that is printed, as usual, in the top righthand corner of the mail item. However, more often than not, it can also include a sender's address 16, an advertising logo or slogan 18, various postal markings such as the postal marking referenced 20, and a specific service marking 22.

In the conventional process of printing a mail item, printing starts via a front edge 24 of the mail item, so that it is always the postal imprint 14 that is printed first, on the righthand side of the mail item, the slogan 18 or the destination address 12 being printed only subsequently.

The present invention proposes reversing the printing process, and starting printing via a rear edge 26 of the mail item, so that the postal imprint 14 is printed last. As shown in FIG. 1, one way of achieving this is to position the envelope upsidedown on a conventional path for conveying mail items (i.e. going from left to right as shown by the arrow), the mail item being jogged in conventional manner against a wall, referenced 28, of a conventional franking machine whose architecture is thus unchanged, however, the mail item is jogged via its bottom longitudinal edge 30, and no longer via its top longitudinal edge 32, as is conventional. Alternatively, and as shown in FIG. 2, this can also be achieved by reversing the direction in which the mail items are conveyed, so that they are then conveyed from right to left (shown by the direction of the arrow), thereby requiring a new architecture for the franking machine, but with jogging continuing to be applied via the top longitudinal edge 32.

FIG. 3 shows an embodiment of the new franking-machine architecture. It firstly comprises a differential weighing module for weighing "on the fly", which performs both a supply function for supplying mail items to the print module, and a weighing function for weighing the mail items. The weighing module includes a reception tray 34 for receiving mail items, and having a bottom that constitutes a weighing plate 36 provided with its weighing cell 38, which, in conventional manner, delivers a weight for each mail item extracted from the tray. Conveyer rollers 40 disposed in the bottom of the tray at the weighing plate enable the mail items present in the tray to be ejected one by one. Light detectors 42 are also provided at the top of the reception tray in order to cause the machine to stop while the tray is being loaded, and thus avoid any errors being made in calculating weights. A print module 44 is mounted directly at the outlet of the weighing and supply module, said print module being interposed between two series of superposed holding rollers: two upstream pinch rollers 46, 48 which take hold of the mail item leaving the weighing and supply module; and two downstream pinch rollers 50, 52 which eject the printed mail item towards some suitable receptacle 54. One of the two rollers, preferably the top roller 46, 50, is motor-driven, the other roller being mounted idle. In conventional manner, the rollers can optionally be replaced by belts. The print module is of the conventional ink-jet type with one or two print heads that move transversely relative to the path along which the mail items are conveyed, so as to enable printing to take place over the entire width of the mail item. However, depending on the technology implemented, the use of a single, stationary row of nozzles is also possible.

A presence sensor 56 for detecting the passage of the mail items is interposed between the weighing and supply module 34-42 and the print module 44. The sensor can be of any known type: mechanical, physical, or optical. More precisely, it detects both the passage of the leading edge of the mail items, which, in this case, constitutes their rear edge 26 and is the start signal signaling the start of the print cycle, and the passage of the trailing edge of the mail items, which, in this case, constitutes their front edge 24 and gives the start signal for calculating the weight of the mail item and the enciphering data.

The calculation is performed in a processing module 58 which receives raw information from the weighing cell 38 to which it is connected, and which transmits the data necessary for printing the mail item to the print module 44 which it controls as a function of the state of the sensor 56 to which it is also connected. Naturally, the processing module also controls in conventional manner the movements of the various pinch rollers and conveyor rollers.

The greater compactness achieved with the new architecture compared to the prior art can be seen in particular by comparing FIGS. 3 and 4. In FIG. 4, which shows a prior-art architecture that also integrates a differential weighing module 60, it can be seen that the distance between the outlet of said weighing module 60 and the print module 62 must necessarily be at least as long as the longest mail items to be printed. The weight of a mail item can be obtained only after said mail item has left the weighing plate, thereby necessarily implying that the print module is remote from the weighing and supply module by a distance of at least one article length, so as to be able to print the postal imprint on the righthand side of said item. Thus, if it is desired to print A4-format envelopes, the distance D must be about 300 millimeters (mm).

In contrast, with the architecture of the present invention shown above in FIG. 3, because of the reversed printing processes, the distance D is independent of the size of the mail item to be printed, and is reduced to a minimum distance of about 60 mm corresponding to the standard length of a European postal imprint, which distance might possibly need to be increased by an additional distance corresponding solely to the calculation time necessary for determining the weight of the mail item, and for enciphering the postal data, should that time correspond to a greater distance. The saving is therefore considerable (the distance D is thus divided by a factor of up to 5), and thus enables a machine to be made that is particularly compact, therefore easily transportable, and providing a well organized workstation.

Figure 5:
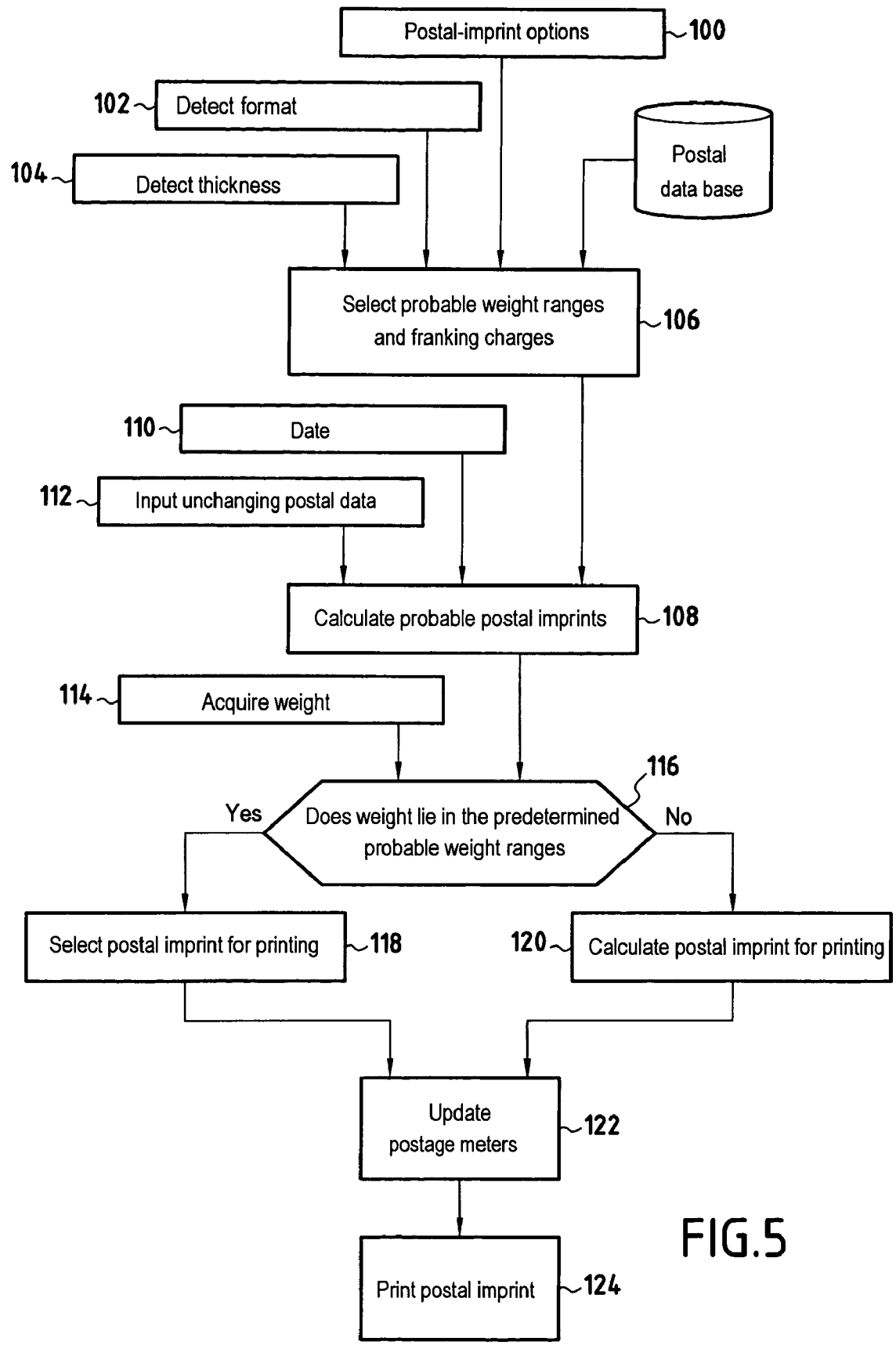
FIG. 5 is a flow-chart for anticipated calculation of an enciphered postal imprint.

It should be noted that the above-mentioned calculation time can be reduced by proceeding, directly in the receiving tray, and by means of appropriate sensors, with prior detection of the format and of the thickness of the mail item to be weighed, as shown in FIG. 5, so as to provide an anticipated calculation of the enciphered postal imprint. Starting from the postal print options (the destination, the class of mail, or the required service) that are taken into account in a first step 100, from the format detection in step 102, from the thickness detection in step 104, and from a postal database, it is possible to make a better estimate in a following step 106 of the weight range(s), and therefore of the franking charges corresponding to the postal data, and therefore, in a subsequent step 108, it is possible to calculate the most probable enciphered postal imprint(s), while the print date (step 110) and the fixed postal data (step 112) are also known. Acquiring the exact weight of the mail item in step 114 thus generates automatic selection of the particular postal imprint that is to be printed, in step 118, providing the weight falls into the forecast range(s) (positive result at test step 116), the calculation time thus being limited to a mere confirmation of the estimated range. Associated with prior sorting of the mail items, this anticipated calculation makes it possible to maintain high operating speeds. If the estimate turns out to be wrong (negative result at test step 116), it remains possible either to slow down, or even stop the conveyor means, so as to perform a precise calculation of the enciphered postal imprint to be printed (step 120), or else to direct the mail item towards a pending tray for subsequent processing (special marking can enable the calculation to pick up where it left off. Printing is then performed conventionally from said data (step 124) after ensuring that the various franking meters are previously updated (step 122), it being understood that all the fixed postal data that does not require any calculation has already been printed.

It should also be noted that applying the FIG. 1 method to a conventional franking machine also makes it possible to reduce the dimensions of said machine. In this configuration it is no longer necessary to comply with a distance D equal to the longest mail item to be printed, it sufficing to leave, between the outlet of the weighing and supply module and the print module, a distance equal only to the length of the postal imprint to be printed. When mail is processed at high speeds, this distance may need to be increased to allow time to acquire the weight of the article and to encipher the postal data. However, the distance can be retained if the speed at which the mail item is conveyed is slowed down or stopped. Consequently, moving the print module closer to the weighing and supply module by eliminating the conveyor means conventionally situated between the two modules makes it possible to obtain a machine that is more compact.

What is claimed is:

1. A printing method for printing a mail item in a franking machine including a print module disposed directly at the outlet from a differential weighing module, the mail item including postal-imprint data and other printed data, the method comprising the following steps:

determining the format and the thickness of a mail item so as to enable the postal imprint to be calculated in anticipation;

launching the weighing operation by conveying the mail item from the differential weighing module to the print module;

printing said other printed data on the mail item;

detecting the end of the weighing operation by the mail item being output from the differential weighing module;

determining the weight of the mail item;

calculating the postal imprint to be printed; and printing postal-imprint data on the mail item, wherein the step of printing said other printed data occurs before the step of printing the postal-imprint data, wherein the process of printing on the mail item is performed continuously from its rear edge to its front edge, the mail item being upright with the postage imprint in the right-hand corner of the mail item.

2. A printing method for printing a mail item in a franking machine including a print module disposed directly at the outlet from a differential weighing module, the mail item including postal-imprint data and other printed data, the method comprising the following steps:

determining the format and the thickness of a mail item so as to enable the postal imprint to be calculated in anticipation;

launching the weighing operation by conveying the mail item from the differential weighing module to the print module;

printing said other printed data on the mail item;

detecting the end of the weighing operation by the mail item being output from the differential weighing module;

determining the weight of the mail item;

calculating the postal imprint to be printed; and printing postal-imprint data on the mail item, wherein the step of printing said other printed data occurs before the step of printing the postal-imprint data, wherein the process of printing on the mail item is performed continuously from its rear edge to its front edge, with the mail item then being upsidedown and the postal imprint being presented in the bottom lefthand corner.

\* \* \* \* \*